US007107060B2

(12) United States Patent
Fisher (10) Patent No.: US 7,107,060 B2
(45) Date of Patent: *Sep. 12, 2006

(54) METHOD OF OPTIMIZING AN IMPLEMENTATION OF FAST-DYNAMIC CHANNEL ALLOCATION CALL ADMISSION CONTROL IN RADIO RESOURCE MANAGEMENT

(75) Inventor: Xiaochun Xu Fisher, E. Setauket, NY (US)

(73) Assignee: InterDigital Technology Corporation, Wilmington, DE (US)

(*) Notice: Subject to any disclaimer, the term of this patent is extended or adjusted under 35 U.S.C. 154(b) by 309 days.

This patent is subject to a terminal disclaimer.

(21) Appl. No.: 10/744,800

(22) Filed: Dec. 23, 2003

(65) Prior Publication Data

US 2004/0192318 A1 Sep. 30, 2004

Related U.S. Application Data

(60) Provisional application No. 60/450,927, filed on Feb. 27, 2003.

(51) Int. Cl.
*H04Q 7/20* (2006.01)

(52) U.S. Cl. ............... 455/452.1; 455/450; 455/452.2; 370/332; 370/328; 370/458

(58) Field of Classification Search ............ 455/450, 455/451, 452.1, 452.2, 412.1, 414.1, 464, 455/509, 512, 513, 63.1, 67.11, 67.13; 370/230, 370/235, 280, 331, 335, 337, 345, 328, 329, 370/241.1

See application file for complete search history.

(56) References Cited

U.S. PATENT DOCUMENTS

| 5,359,596 | A  | * | 10/1994 | Sadiq ........................ 370/362 |
|-----------|----|---|---------|----------------------------------------|
| 6,473,442 | B1 |   | 10/2002 | Lundsjö et al.                         |
| 6,487,415 | B1 | * | 11/2002 | Eibling et al. ............. 455/453   |
| 6,791,961 | B1 | * | 9/2004  | Zeira et al. ................ 370/335  |
| 2001/0036823 | A1 |  | 11/2001 | Van Lieshout et al.                 |
| 2002/0003782 | A1 | * | 1/2002 | Pan et al. ................... 370/280 |
| 2002/0009061 | A1 |  | 1/2002  | Willenegger                         |
| 2002/0094817 | A1 |  | 7/2002  | Rune et al.                         |
| 2002/0119783 | A1 |  | 8/2002  | Bourlas et al.                      |
| 2002/0119796 | A1 |  | 8/2002  | Vanghi                              |
| 2003/0123388 | A1 | * | 7/2003 | Bradd ........................ 370/230  |
| 2004/0214582 | A1 | * | 10/2004 | Lan et al. ................ 455/452.2 |
| 2005/0148337 | A1 | * | 7/2005 | Karlsson et al. ............ 455/453  |
| 2005/0190729 | A1 | * | 9/2005 | Roy et al. .................. 370/336  |

* cited by examiner

*Primary Examiner*—Jean Gelin
(74) *Attorney, Agent, or Firm*—Volpe and Koenig, P.C.

(57) ABSTRACT

A method of optimizing a fast dynamic channel allocation call admission control algorithm in a wireless communication system includes a pre-code allocation process, a signal-independent code allocation process, and a post-code allocation process. The pre-code allocation process includes receiving and processing a request message and obtaining system measurements and information from a centralized database. The code allocation process begins by checking the availability of a code set in the cell and generating timeslot sequences for the available timeslots. A code set is assigned to the available timeslots in a timeslot sequence, wherein a successful assignment is a solution. The interference signal code power (ISCP) is calculated for each solution and the solution having the lowest weighted ISCP is selected as an optimal solution. The post-code allocation process includes storing allocation information in a centralized database and creating a response message.

23 Claims, 6 Drawing Sheets

METHOD OF OPTIMIZING AN IMPLEMENTATION OF FAST-DYNAMIC CHANNEL ALLOCATION CALL ADMISSION CONTROL IN RADIO RESOURCE MANAGEMENT

CROSS REFERENCE TO RELATED APPLICATIONS

This application claims priority from U.S. Provisional Application No. 60/450,927, filed Feb. 27, 2003, which is incorporated by reference as if fully set forth herein.

FIELD OF THE INVENTION

The present invention relates generally to radio resource management in wireless communication systems, and more particularly to optimization of a fast dynamic channel allocation (F-DCA) call admission control (CAC) algorithm in radio resource management (RRM).

BACKGROUND OF THE INVENTION

In wireless communication systems, RRM is generally responsible for utilizing the air interface resources. RRM is used to guarantee quality of service (QoS), to provide efficient use of the radio resources, and to increase system capacity. RRM consists of admission control, handover, power control, and congestion control functionalities. Admission control can be divided into user admission control and call admission control. User admission control accepts or rejects the radio resource control (RRC) connection requested by a wireless transmit/receive unit (WTRU). Call admission control accepts or rejects a request to establish or modify a radio access bearer (RAB) in the radio access network (RAN). Call admission control is located in the controlling radio network controller (C-RNC).

There are two dynamic channel allocation (DCA) functions, slow DCA and fast DCA (S-DCA, F-DCA). The S-DCA allocates the radio resources to cells while the F-DCA allocates the radio resources to bearer service. The F-DCA call admission control functions are responsible for efficiently allocating or changing the allocations of physical resources. When a request for physical resources is received, the call admission control will accept or reject the request based on the availability of physical resources and interference level in the cell. The request can be accepted only if both uplink and downlink call admission control admit it. Otherwise, the request is rejected.

In order to guarantee the QoS and minimize the interference, a certain F-DCA call admission control algorithm has been currently implemented. But the previous implementation of the F-DCA call admission control algorithm has several limitations. One limitation is that it is difficult to be reused by other RRM functions since the main interface function is large and the inputs to the code allocation function (which forms the core function of the F-DCA call admission control algorithm) are dependent on the signal message. A second limitation is that the past implementation of the F-DCA CAC algorithm is generally only suitable for real time (RT) service.

It is desirable to provide an optimized implementation of the F-DCA CAC algorithm which is suitable for RT and NRT (non-real time), and which overcomes the disadvantages of the known algorithms.

SUMMARY OF THE INVENTION

The present invention improves and optimizes the known F-DCA CAC algorithm implementation by modularizing/categorizing the functionality of the F-DCA CAC algorithm and making the inputs to the core functions of this algorithm independent of signal messages. The invention is described in the context of layer 3 in a time-division duplex (TDD) scenario, but is applicable without limitation to other modes of transmission as well.

The ongoing development of third generation wireless telecommunication systems requires new and efficient radio resource management. The present invention provides an optimization to the implementation of the F-DCA CAC algorithm for radio link setup procedure in RRM. The inventive method modularizes and modifies the implementation of F-DCA CAC algorithm for radio link setup into three processes: pre-code allocation, code allocation, and post-code allocation. The functions in both the pre-code allocation process and the post-code allocation process are signal-dependent, while the functions in code allocation process are signal-independent. The modularized functions of the present invention can be reused by other RRM algorithms in future RRM implementations in both real time (RT) service and non-real time (NRT) service.

A method of optimizing a fast dynamic channel allocation call admission control algorithm in a wireless communication system includes a pre-code allocation process, a signal-independent code allocation process, and a post-code allocation process. The pre-code allocation process includes receiving and processing a request message and obtaining system measurements and information from a centralized database. The code allocation process begins by checking the availability of codes in the cell and generating timeslot sequences for the available timeslots. A code set is assigned to the available timeslots in a timeslot sequence, wherein a successful assignment is a solution. The interference signal code power (ISCP) is calculated for each solution and the solution having the lowest weighted ISCP is selected as an optimal solution. The post-code allocation process includes storing allocation information in a centralized database and creating a response message.

A method for a fast dynamic channel allocation call admission control (CAC) in a wireless communication system begins by receiving and processing a request message to initiate the CAC function. Node B measurements, a list of available timeslots, and a list of code sets are retrieved from a centralized database. A set of codes is allocated to the available timeslots and the allocation information is stored in the centralized database. A response message is sent with the results of the code allocation process.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF PREFERRED EMBODIMENT

Figure 1:
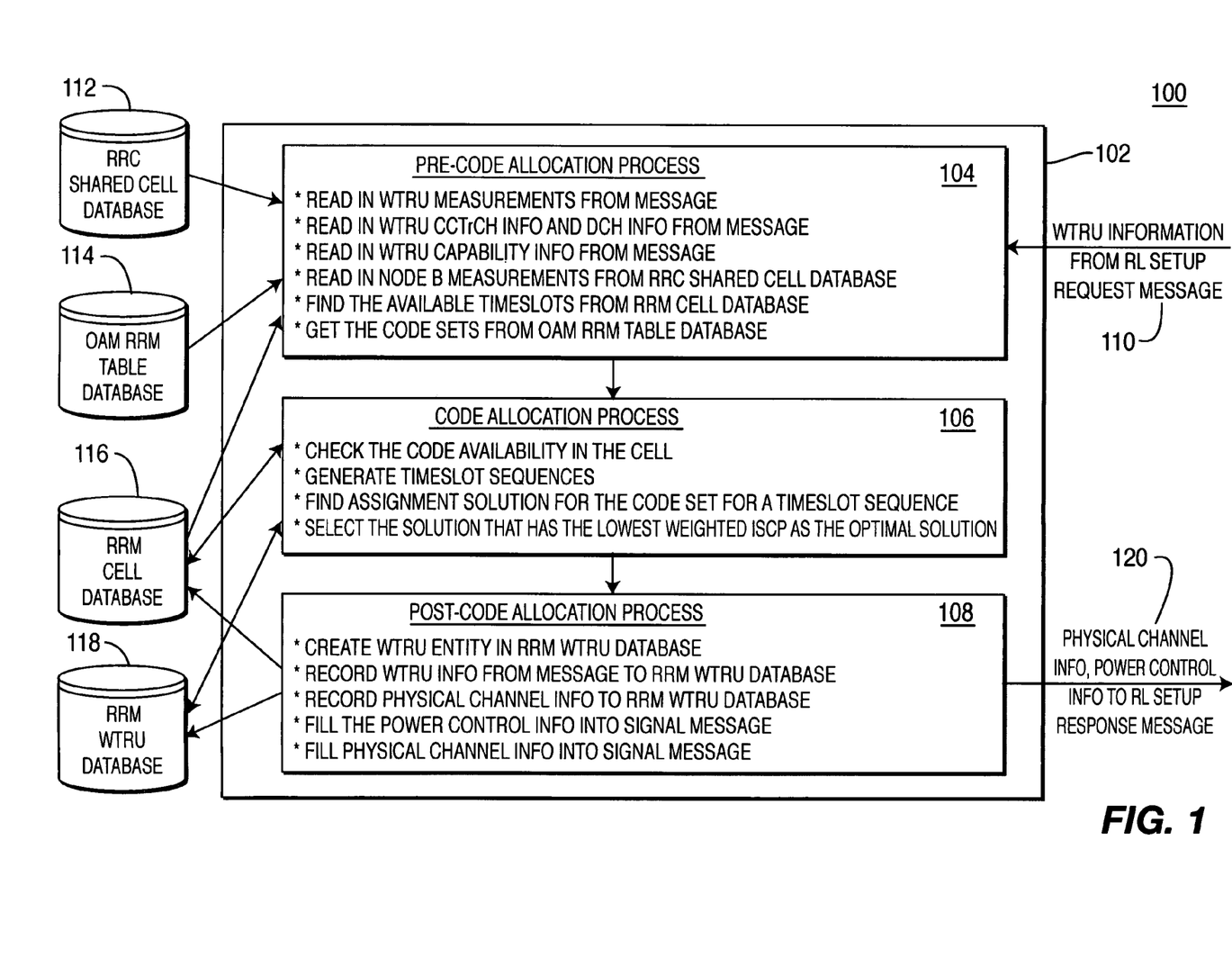
FIG. 1 is an overview of the F-DCA CAC algorithm for radio link setup.

An overview 100 of the F-DCA CAC algorithm for radio link setup procedure 102 is shown in FIG. 1. The main function of the F-DCA CAC algorithm 102 consists of three parts: the pre-code allocation process 104, the code allocation process 106, and the post-code allocation process 108. The pre-code allocation process 104 reads WTRU measurements from radio link setup request message 110 and Node B measurements from the RRC shared cell database 112 and prepares the inputs (a list of available timeslots from the RRM cell database 116 and a list of code sets from the operations and maintenance (OAM) RRM table database 114) for the code allocation.

The code allocation process 106 checks the code availability in the cell, generates timeslot sequences, finds the optimal solution for the code set (assigns the codes in the code set to the available timeslots), and allocates the channelized codes from the code vectors in a RRM cell database 116. The post-code allocation process 108 is responsible for creating a WTRU entity in a RRM WTRU database 118, recording the allocated physical channels in the RRM WTRU database 118, recording the physical channel parameters and power control information in the radio link setup response message 120.

In addition to the data exchanges between the processes and the databases, there are data exchanges occurring directly between the processes. The WTRU measurements, the Node B measurements, a list of the available timeslots in the cell, a list of code sets for the specific data rate, and WTRU capability information are passed from the pre-code allocation process 104 to the code allocation process 106. The physical channel information (a list of timeslots and channelized codes in each timeslot) are passed from the code allocation process 106 to the post-code allocation process 108.

In the present invention, the functions of the F-DCA CAC algorithm for radio link setup procedure 102 are modularized into two groups of functions: signal-dependent functions whose inputs are parts of signal messages and signal-independent functions whose inputs are independent of signal messages. The purpose of separating the signal-dependent functions and the signal-independent functions is to increase the reusability of the signal-independent functions. The functions of both the pre-code allocation process 104 and the post-code allocation process 108 are signal-dependent functions. In contrast, the functions of the code allocation process 106 are signal-independent functions. It is to be noted that the functions of the code allocation process 106 can be reused by other procedures in other RRM function implementations, such as handover, F-DCA escape algorithm, and F-DCA background interference reduction algorithm.

The flowcharts for functions of the F-DCA CAC algorithm for radio link setup are shown in FIGS. 2a–3b.

Figure 2A:
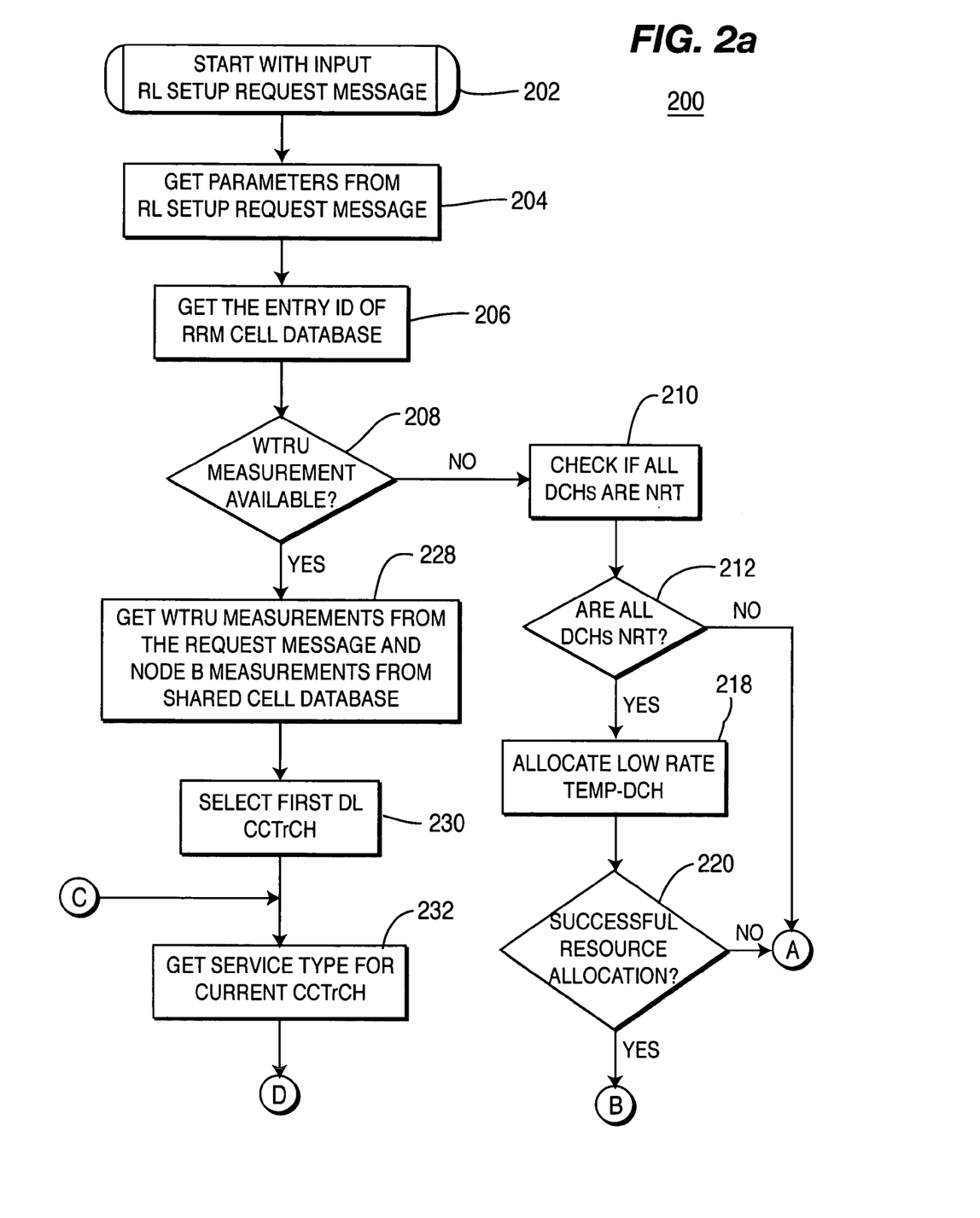
FIGS. 2a–2c are flowcharts of the F-DCA CAC algorithm for radio link setup shown in FIG. 1.
Figure 2B:
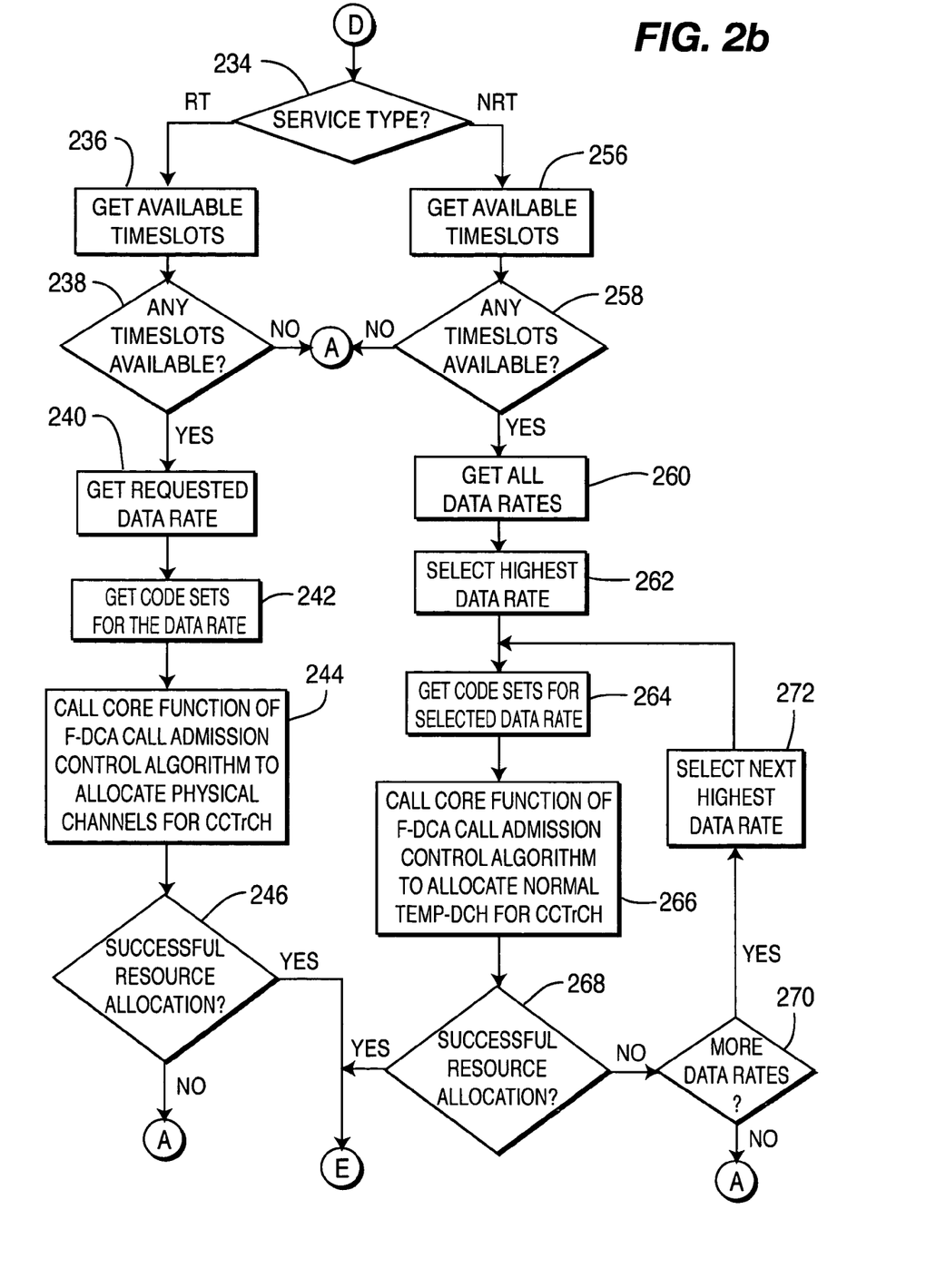
Figure 2C:
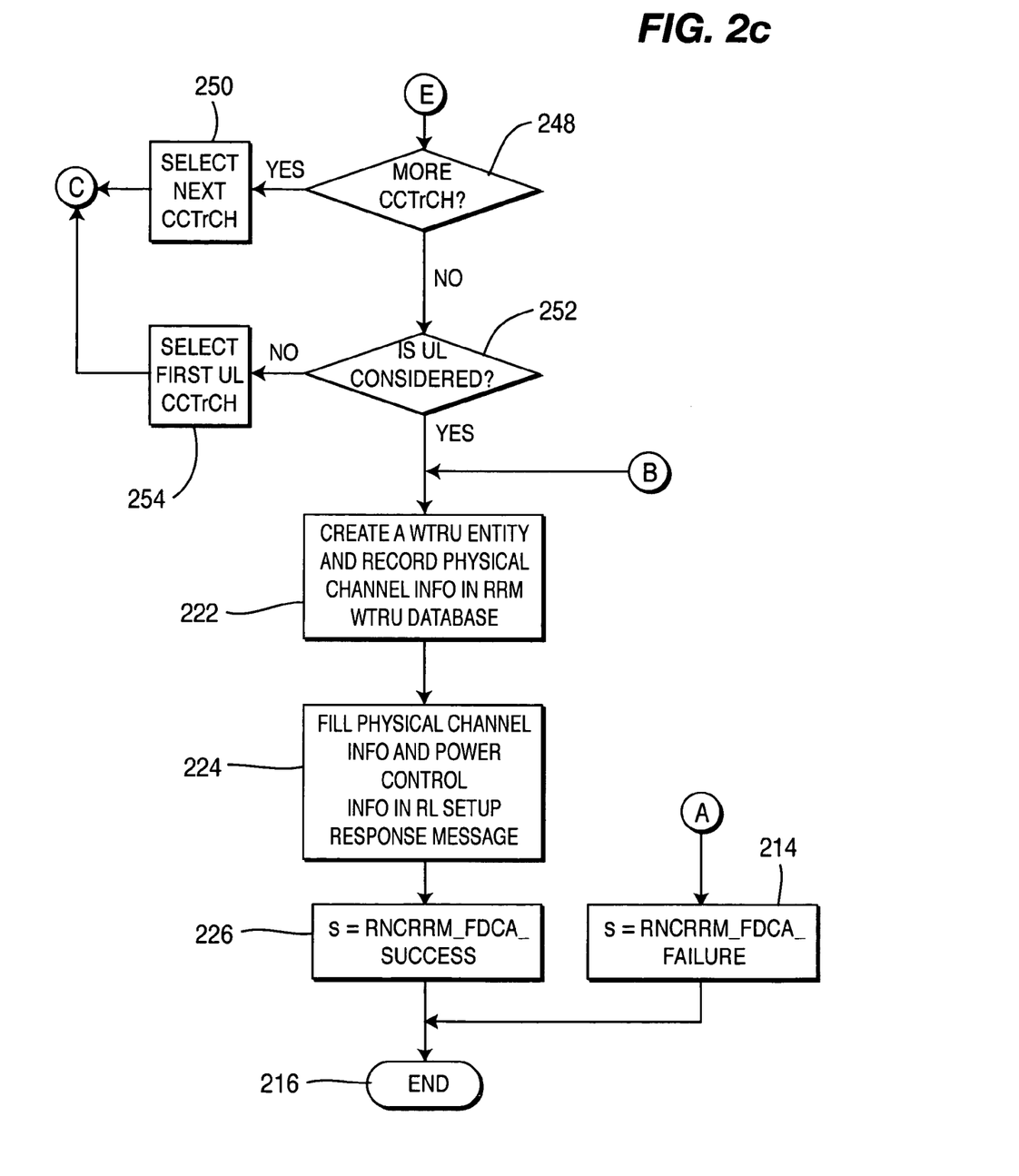

FIGS. 2a–2c show the main interface function 200 of the F-DCA CAC algorithm for radio link (RL) setup. The function 200 begins by obtaining the RL setup request message (referred to hereinafter as "request message"; step 202) and extracting parameters from the request message (step 204). The request message contains coded composite transport channel (CCTrCH) information, dedicated channel (DCH) information, RL information with or without WTRU measurements, and WTRU capability information. The parameters extracted from the request message include information such as the WTRU identification, the cell identification, the RL identification, and WTRU capability information (the maximum number of physical channels per timeslot and the maximum number of timeslots per frame).

The entry identification of the RRM cell database is obtained (step 206). Next, a determination is made whether the WTRU measurements, which include the downlink interference signal code power (DL ISCP), are included in the request message (step 208). If the WTRU measurements are not included in the request message, then a check is made to determine whether all of the DCHs are non-real time (NRT; steps 210 and 212). If all the DCHs are not NRT, then a status flag is set to indicate a failure condition (step 214) and the function terminates (step 216). The failure condition means that there are no physical resources available for the WTRU. It is noted that all DCHs not being NRT alone is not a failure condition. The failure condition is reached when there are no WTRU measurements and all the DCHs are not NRT.

If all the DCHs are NRT (step 212), then the low rate temporary DCHs are allocated for the present CCTrCH (step 218). After the channels are allocated, a determination is made whether the resource allocation was successful (step 220). If the resource allocation was not successful, then the status flag is set to indicate a failure condition (step 214) and the function terminates (step 216). If the resource allocation was successful (step 220), then a WTRU entity is created and the WTRU information and the physical channel parameters are recorded in the RRM WTRU database (step 222). The information recorded to a WTRU entity includes the WTRU identification, the transaction identification, the uplink (UL) WTRU capability information, the downlink (DL) WTRU capability information, and the RL information. The UL WTRU capability information includes the maximum number of timeslots per frame and the maximum number of UL physical channels per timeslot. The DL WTRU capability information includes the maximum number of timeslots per frame and the maximum number of DL physical channels per frame. The RL information includes the RL identification, the cell identification, the UL CCTrCH information, and the DL CCTrCH information. The CCTrCH information includes the CCTrCH identification, the CCTrCH status, the CCTrCH signal to interference (SIR) target, the guaranteed data rate, the allowed data rate, and the dedicated physical channel (DPCH) information. The DPCH information includes a list of timeslots, the midamble shift and burst type, the transport format code indicator (TFCI) presence, and the code information. The code information includes the channelized code, the code usage status, the DPCH identification, and the code SIR target.

Next, the physical channel information and power control information is placed into a RL setup response message (step 224), the status flag is set to indicate a success condition (step 226), and the function terminates (step 216). The physical channel information includes a list of timeslots and the channelized codes in each timeslot. The timeslot information includes a repetition period and a repetition length. The power control information includes the UL target SIR, the maximum UL SIR, the minimum UL SIR, the initial DL transmission power, the minimum DL transmission power, and the maximum allowed UL transmission power. In one implementation of the present invention, a single data structure is used for both the request message and the response message since these two messages include a large amount of common information.

If the WTRU measurements are available in the request message (step 208), then the WTRU measurements are retrieved from the request message and Node B measurements are obtained from the RRC shared cell database (step 228). The Node B measurements include common measurements and dedicated measurements. The Node B common measurements include the UL ISCP and the DL transmitted carrier power. The Node B dedicated measurements include the DL transmitted code power. The first DL CCTrCH is selected (step 230) and the service type for the selected CCTrCH is obtained (step 232). If the service type is real time (RT; step 234), the available timeslots in the cell are determined (step 236). If no timeslots are available (step 238), the status flag is set to indicate a failure condition (step 214) and the function terminates (step 216).

If there are timeslots available (step 238), then the requested data rate is calculated (step 240). The code sets for the calculated data rate are obtained (step 242) and the physical channels (timeslots and codes) for the present CCTrCH are allocated and the optimal solution is recorded if found (step 244). The allocation function in step 244 is discussed in greater detail below in connection with FIGS. 3a and 3b. If the resource allocation was not successful (step 246), then the status flag is set to indicate a failure condition (step 214) and the function terminates (step 216).

If the resource allocation was successful (step 246), then a determination is made whether there are additional CCTrCHs to be examined (step 248). If there are additional CCTrCHs to be examined, then the next CCTrCH is selected (step 250) and the function continues at step 232. If there are no additional CCTrCHs to be examined (step 248), then a determination is made whether the UL CCTrCHs have been examined (step 252). If the UL CCTrCHs have not been examined, then the first UL CCTrCH is selected (step 254) and the function continues at step 232. If all of the UL CCTrCHs have been considered (step 252), then the function continues at step 222, as described above.

If the service type is NRT (step 234), the available timeslots in the cell are determined (step 256). If no timeslots are available (step 258), the status flag is set to indicate a failure condition (step 214) and the function terminates (step 216).

If there are timeslots available (step 258), then all data rates suitable for the NRT service are determined (step 260) and the highest data rate is selected (step 262). The code sets for the selected data rate are obtained (step 264) and the normal temporary DCHs for the present CCTrCH are allocated and the optimal solution is recorded if found (step 266). It is noted that steps 244 and 266 are essentially the same; in NRT service, the DCHs are temporary.

If the resource allocation was not successful (step 268), then a determination is made whether there are additional data rates to be examined (step 270). If there are no other data rates to be examined, then the status flag is set to indicate a failure condition (step 214) and the function terminates (step 216). If there are other data rates to be examined (step 270), then the next highest data rate is selected (step 272) and the function continues at step 264. If the resource allocation was successful (step 268), then the function continues at step 248 as described above.

It is noted that in connection with steps 230, 252, and 254 that either direction (DL or UL) can be performed first. As described above, the DL direction is examined prior to the UL direction. The function 200 will operate in the same manner if instead the UL was examined prior to the DL.

The steps 244 and 266 relate to calling the core function of the F-DCA CAC algorithm to allocate the physical channels. This core function 300 is signal-independent and is described in connection with FIGS. 3a and 3b. The function 300 begins by receiving the code sets and the available timeslots as inputs (step 302). The first code set is selected (step 304) and a determination is made whether the code set is available in the cell (steps 306 and 308). If the selected code set is not available in the cell, then a determination is made whether there are more code sets to be examined (step 310). If there are more code sets, then the next code set is selected (step 312) and the function continues with step 306. If there are no more code sets, this indicates a failure condition, and a status flag is set to indicate that no solution is available (step 314) and the function terminates (step 316).

Figure 3A:
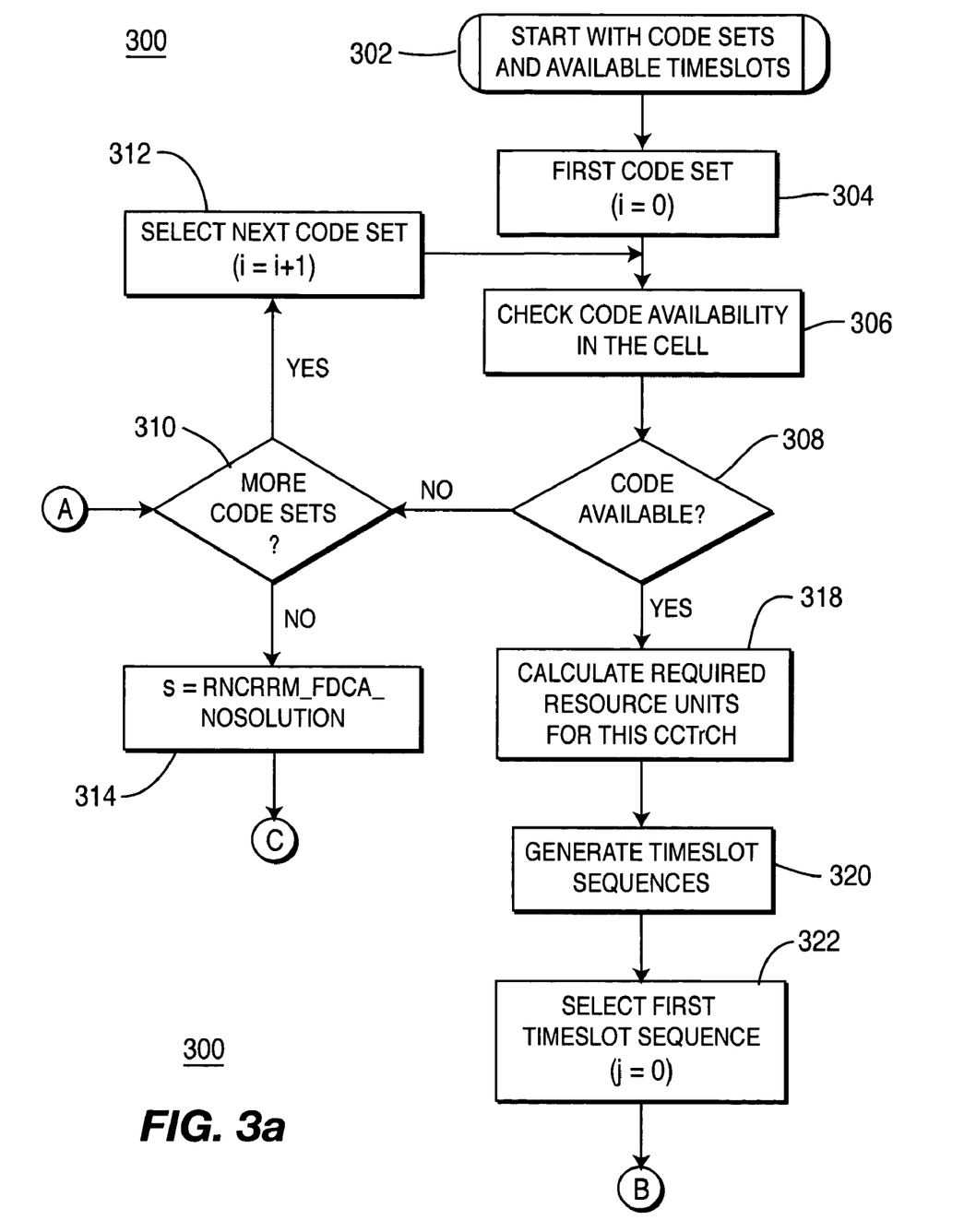
FIGS. 3a and 3b are flowcharts for the channel allocation function for the F-DCA CAC algorithm shown in FIGS. 2a–2c.
Figure 3B:
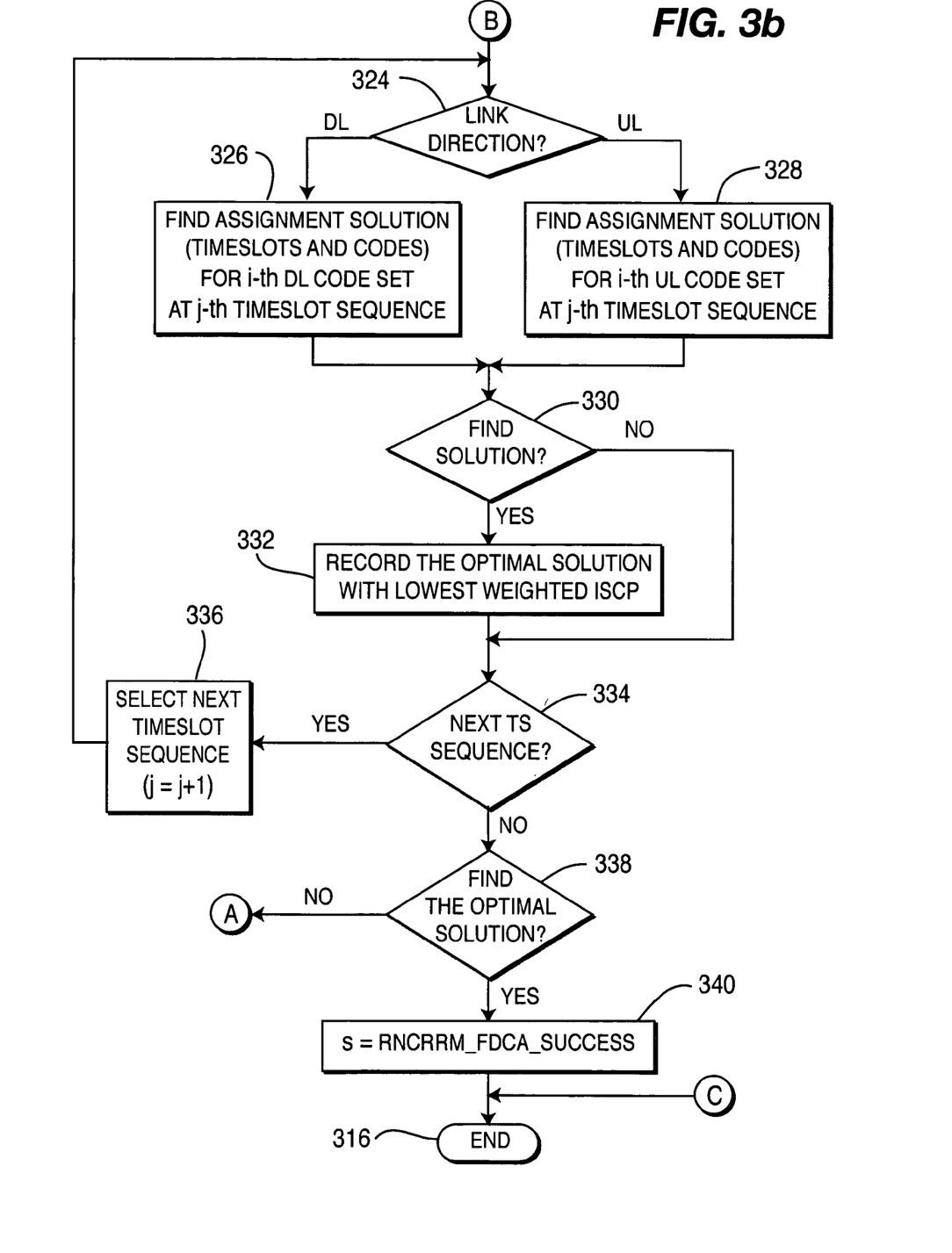

If the selected code set is available in the cell (step 308), then the required resource units for the code set in the CCTrCH are calculated (step 318). The timeslot sequences are generated (step 320) and the first timeslot sequence is selected (step 322). The link direction, either downlink (DL) or uplink (UL), is then determined (step 324). If the link direction is DL, then an attempt is made to assign the current DL code set into the available timeslots in the current timeslot sequence (step 326). If the link direction is UL (step 324), then an attempt is made to assign the current UL code set into the available timeslots in the current timeslot sequence (step 328). In an alternate embodiment of the present invention (not shown), step 324 can be eliminated and steps 326 and 328 can be combined into a single step, to provide additional optimization.

After an attempt has been made to assign the current code set to the available timeslots in the current timeslot sequence (steps 326, 328), a determination is made whether an assignment solution has been found (step 330), indicating that the code set was successfully assigned to the available timeslots in the current timeslot sequence. If a solution has been found, then the ISCP of the solution is determined, and the solution having the lowest weighted ISCP is considered to be the optimal solution and is recorded (step 332). If no solution was found (step 330), then step 332 is skipped.

Next, a determination is made whether there are any additional timeslot sequences to be considered (step 334). If there are additional timeslot sequences, then the next timeslot sequence is selected (step 336) and the function continues with step 324. If there are no additional timeslot sequences (step 334), then a determination is made whether an optimal solution has been found (step 338). If no optimal solution has been found, then the function continues with step 310. If the optimal solution has been found, then the status flag is set to indicate a successful assignment (step 340) and the function terminates (step 316).

In past implementations of the F-DCA CAC algorithm, the functions 326 and 328 are signal-dependent. In the present invention, these two functions are modified to become signal-independent functions. All related functions used in these two functions are also modified to become signal-independent functions. Because the inputs of the functions 326, 328 are independent of the signal message (such as the RL setup request message), the functions 326, 328 can be used by other RRM procedures.

It is noted that the above-described implementation of the F-DCA CAC algorithm is exemplary and can be further optimized. For example, as discussed above, the steps 326 and 328 can be combined into a single step, and step 324 can be eliminated. Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA. While specific embodiments of the present invention have been shown and described, many modifications and variations could be made by one skilled in the art without departing from the scope of the invention. The above description serves to illustrate and not limit the particular invention in any way.

What is claimed is:

1. A method of optimizing a fast dynamic channel allocation call admission control algorithm in a wireless communication system, comprising:
   a pre-code allocation process;
   a signal-independent code allocation process, including:
      checking the availability of a code set in the cell;
      generating timeslot sequences for the available timeslots;
      assigning a code set to the available timeslots in a timeslot sequence, wherein a successful assignment is a solution;
      calculating the interference signal code power (ISCP) for each solution; and
      selecting the solution having the lowest weighted ISCP as an optimal solution; and
   a post-code allocation process.

2. The method according to claim 1, wherein the pre-code allocation process includes:
   receiving a request message;
   processing the request message;
   obtaining Node B measurements from a centralized database; and
   obtaining available timeslots from the centralized database.

3. The method according to claim 2, wherein the processing the request message step includes:
   reading wireless transmit/receive unit (WTRU) measurements from the request message;
   reading WTRU coded composite transport channel information and dedicated channel information from the request message;
   reading WTRU capability information from the request message; and
   obtaining code sets from the centralized database, based upon a requested data rate contained in the request message.

4. The method according to claim 1, wherein the post-code allocation process includes:
   storing allocation information in a centralized database; and
   creating a response message.

5. The method according to claim 4, wherein the storing step includes:
   creating a wireless transmit/receive unit (WTRU) entity in the database;
   recording WTRU information from the request message in the database; and
   recording physical channel information in the database.

6. The method according to claim 4, wherein the creating step includes:
   adding power control information to the response message; and
   adding physical channel information to the response message.

7. A method for a fast dynamic channel allocation call admission control (CAC) in a wireless communication system, comprising the steps of:
   receiving a request message to initiate the CAC function;
   processing the request message;
   obtaining Node B measurements from a centralized database;
   retrieving a list of available timeslots and a list of code sets from the centralized database;
   allocating a code set to the available timeslots in a timeslot sequence;
   storing the allocation information in the centralized database; and
   sending a response message with the results of the code allocation process.

8. The method according to claim 7, wherein the processing step includes reading wireless transmit/receive unit (WTRU) measurements, WTRU coded composite transport channel information, and dedicated channel information from the request message.

9. The method according to claim 8, wherein the WTRU measurements include downlink interference signal code power.

10. The method according to claim 7, wherein the retrieving step further includes reading Node B measurements from the centralized database.

11. The method according to claim 10, wherein the Node B measurements include:
   common measurements, including uplink interference signal code power and downlink transmitted carrier power; and
   dedicated measurements, including downlink transmitted code power.

12. The method according to claim 7, wherein the allocating step includes the steps of:
   checking the availability of a code set in the cell;
   generating timeslot sequences from the list of available timeslots; and
   assigning a code set to the available timeslots in a timeslot sequence to find a solution, wherein a successful assignment is a solution.

13. The method according to claim 12, wherein the allocating step further includes the steps of:
   calculating an interference signal code power (ISCP) value for the solution; and
   selecting the solution having the lowest weighted ISCP value as an optimal solution.

14. The method according to claim 7, wherein the storing step includes:
   creating a wireless transmit/receive unit (WTRU) entity in the centralized database;
   recording WTRU information from the request message in the centralized database; and
   recording physical channel information in the centralized database.

15. The method according to claim 14, wherein the WTRU information recorded in the centralized database includes:
   the WTRU identification;
   a transaction identification;
   uplink WTRU capability information, including:
      the maximum number of time slots per frame; and
      the maximum number of uplink physical channels per timeslot;
   downlink WTRU capability information, including:
      the maximum number of time slots per frame; and
      the maximum number of downlink physical channels per time slot; and radio link information.

16. The method according to claim 15, wherein the radio link information includes:

the radio link identification;
a cell identification;
uplink code composite transport channel (CCTrCH) information; and
downlink CCTrCH information.

17. The method according to claim 16, wherein the CCTrCH information includes:
a CCTrCH identification;
a CCTrCH status;
a CCTrCH signal to interference ratio target;
a guaranteed data rate;
an allowed data rate; and
dedicated physical channel information.

18. The method according to claim 17, wherein the dedicated physical channel information includes:
dedicated physical channel timeslot information;
a repetition period value; and
a repetition length value.

19. The method according to claim 18, wherein the dedicated physical channel information includes:
a timeslot number;
a midamble shift and burst type;
a transport format combination indicator presence; and
code information.

20. The method according to claim 19, wherein the code information includes:
a channelized code;
a code usage status;
a dedicated physical channel identification; and
a code signal to interference target.

21. The method according to claim 7, wherein the sending step includes filling the response message with power control information and physical channel information.

22. The method according to claim 21, wherein the power control information includes:
an uplink (UL) target signal to interference ratio (SIR);
a maximum UL SIR;
a minimum UL SIR;
an initial downlink (DL) transmission power;
a minimum DL transmission power; and
a maximum allowed UL transmission power.

23. The method according to claim 21, wherein the physical channel information includes:
a list of time slots; and
the channelized codes in each timeslot.

* * * * *